(12) United States Patent
Maeda et al.

(10) Patent No.: US 10,944,111 B2
(45) Date of Patent: Mar. 9, 2021

(54) ELECTRODE FOR LITHIUM ION SECONDARY BATTERY AND LITHIUM ION SECONDARY BATTERY USING THE SAME

(71) Applicant: NEC CORPORATION, Tokyo (JP)

(72) Inventors: Katsumi Maeda, Tokyo (JP); Noriyuki Tamura, Tokyo (JP); Mika Shiba, Tokyo (JP)

(73) Assignee: NEC CORPORATION, Tokyo (JP)

( * ) Notice: Subject to any disclaimer, the term of this patent is extended or adjusted under 35 U.S.C. 154(b) by 54 days.

(21) Appl. No.: 16/345,490

(22) PCT Filed: Oct. 25, 2017

(86) PCT No.: PCT/JP2017/038477
§ 371 (c)(1),
(2) Date: Apr. 26, 2019

(87) PCT Pub. No.: WO2018/079585
PCT Pub. Date: May 3, 2018

(65) Prior Publication Data
US 2019/0280300 A1    Sep. 12, 2019

(30) Foreign Application Priority Data

Oct. 28, 2016   (JP) .............................. JP2016-211715

(51) Int. Cl.
*H01M 4/62*   (2006.01)
*H01M 4/131*  (2010.01)
(Continued)

(52) U.S. Cl.
CPC ............. *H01M 4/62* (2013.01); *H01M 4/131* (2013.01); *H01M 4/133* (2013.01); *H01M 4/505* (2013.01);
(Continued)

(58) Field of Classification Search
None
See application file for complete search history.

(56) References Cited

U.S. PATENT DOCUMENTS 4,100,048 A * 7/1978 Pompei .................. G01N 27/48
                                                204/415
4,383,011 A * 5/1983 McClelland ........ H01M 10/342
                                                429/54
(Continued)

FOREIGN PATENT DOCUMENTS

JP    2001-126766 A    5/2001
JP    2004-047404 A    2/2004
(Continued)

OTHER PUBLICATIONS

International Search Report for PCT/JP2017/038477 dated Jan. 23, 2018 [PCT/ISA/210].

*Primary Examiner* — Scott J. Chmielecki
(74) *Attorney, Agent, or Firm* — Sughrue Mion, PLLC

(57) ABSTRACT

An electrode for lithium ion secondary batteries, including a porous glass particle and a positive electrode active material or negative electrode active material that is capable of occluding and releasing lithium ions wherein the pore volume of the porous glass particle is from 0.1 ml/g to 2 ml/g, is used to provide a lithium ion secondary battery excellent in a charge rate property.

20 Claims, 1 Drawing Sheet

(51) Int. Cl.

| | | |
|---|---|---|
| *H01M 4/133* | (2010.01) | |
| *H01M 4/505* | (2010.01) | |
| *H01M 4/525* | (2010.01) | |
| *H01M 4/587* | (2010.01) | |
| *H01M 10/0525* | (2010.01) | |
| *H01M 10/0567* | (2010.01) | |
| *H01M 10/0568* | (2010.01) | |
| *H01M 10/052* | (2010.01) | |
| *H01M 4/02* | (2006.01) | |

(52) U.S. Cl.
CPC ........... *H01M 4/525* (2013.01); *H01M 4/587* (2013.01); *H01M 10/052* (2013.01); *H01M 10/0525* (2013.01); *H01M 10/0567* (2013.01); *H01M 10/0568* (2013.01); *H01M 2004/021* (2013.01); *H01M 2300/0025* (2013.01); *Y02E 60/10* (2013.01); *Y02T 10/70* (2013.01)

(56) References Cited

U.S. PATENT DOCUMENTS

| | | | | |
|---|---|---|---|---|
| 2010/0040952 | A1* | 2/2010 | Kimura | ............... H01M 4/5815 |
| | | | | 429/245 |
| 2010/0112456 | A1* | 5/2010 | Kimura | ............. H01M 10/0525 |
| | | | | 429/304 |
| 2010/0308278 | A1* | 12/2010 | Kepler | .................. H01M 4/505 |
| | | | | 252/506 |
| 2013/0302684 | A1* | 11/2013 | Koshika | .............. H01M 4/5805 |
| | | | | 429/220 |
| 2013/0330613 | A1* | 12/2013 | Saruwatari | ............ H01M 4/661 |
| | | | | 429/211 |
| 2014/0079873 | A1* | 3/2014 | Miki | ..................... H01M 4/366 |
| | | | | 427/58 |
| 2014/0170494 | A1* | 6/2014 | Paulsen | ................. H01M 4/366 |
| | | | | 429/223 |
| 2014/0227610 | A1* | 8/2014 | Aburatani | ............... C03C 10/00 |
| | | | | 429/322 |
| 2017/0133650 | A1* | 5/2017 | Krishnamoorthy | ... H01M 2/145 |
| 2018/0226677 | A1* | 8/2018 | Nishiura | ............... H01M 4/483 |

FOREIGN PATENT DOCUMENTS

| | | |
|---|---|---|
| JP | 2007-250510 A | 9/2007 |
| JP | 2009-043536 A | 2/2009 |
| JP | 2011-134691 A | 7/2011 |
| JP | 2014-191904 A | 10/2014 |
| JP | 2015-095329 A | 5/2015 |
| JP | 2016-066461 A | 4/2016 |
| WO | 2013/047016 A1 | 4/2013 |
| WO | 2015/146900 A1 | 10/2015 |

* cited by examiner

[FIG. 1]
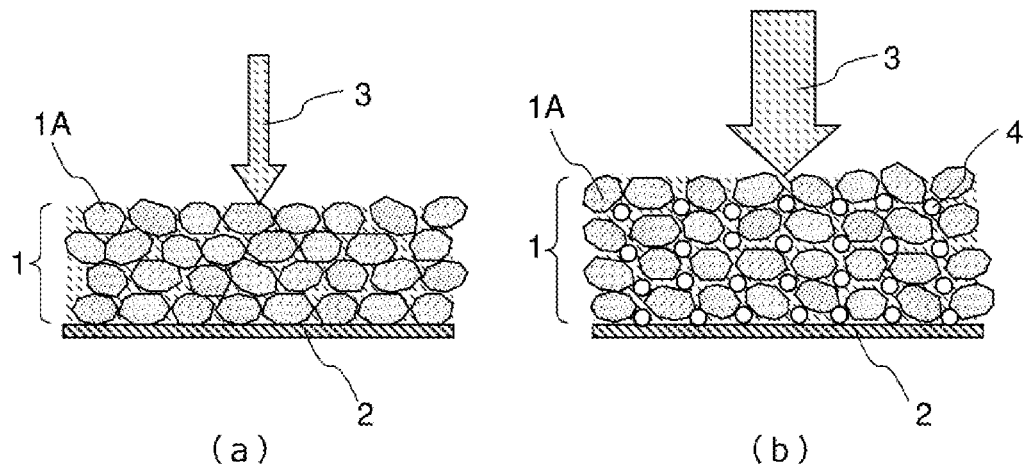
(a)   (b)
[FIG. 2]
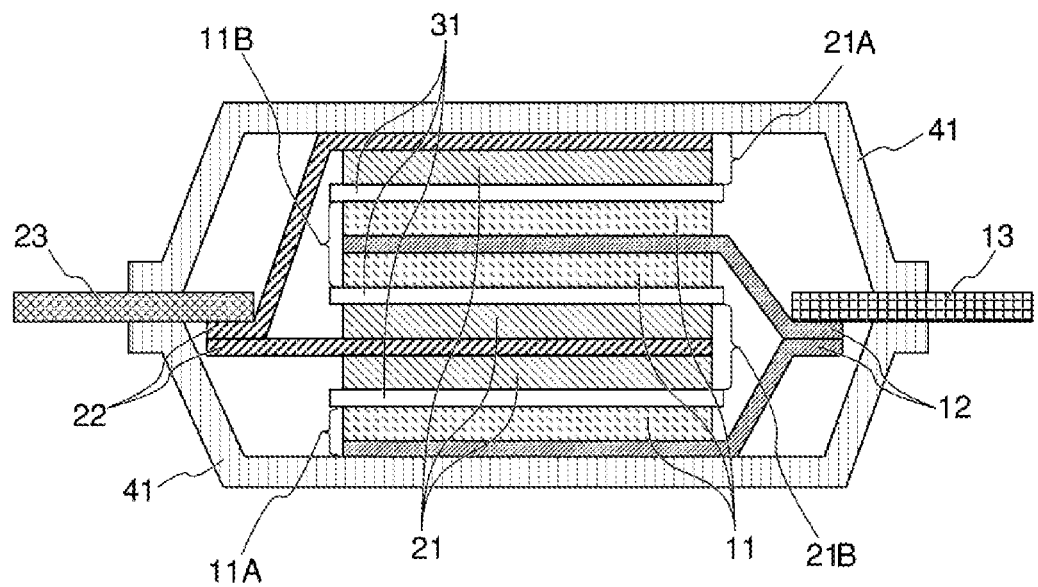

ELECTRODE FOR LITHIUM ION SECONDARY BATTERY AND LITHIUM ION SECONDARY BATTERY USING THE SAME

CROSS REFERENCE TO RELATED APPLICATIONS

This application is a National Stage of International Application No. PCT/JP2017/038477 filed Oct. 25, 2017, claiming priority based on Japanese Patent Application No. 2016-211715 filed Oct. 28, 2016.

TECHNICAL FIELD

The present invention relates to an electrode for a lithium ion secondary battery and a lithium ion secondary battery using the same.

BACKGROUND ART

Lithium ion secondary batteries have been practically used as a battery for small electronic devices such as notebook computers, mobile phones and the like due to advantages such as high energy density, low self-discharge, excellent long term reliability and the like. In recent years, lithium ion secondary batteries are being developed as an accumulator for electric vehicles, a household storage battery and a storage battery for electric power storage.

In a lithium ion secondary battery, a lithium composite metal oxide containing lithium is used as a positive electrode active material and a carbon material such as graphite is used as a negative electrode active material. As an electrolytic solution, a solution in which a lithium salt such as $LiPF_6$ or the like as an electrolyte is dissolved in a chain- or cyclic-carbonate solvent is used.

In such a lithium ion secondary battery, there is a demand for a battery having an excellent charge rate property that can be charged in a short period of time even if a battery with high energy density is used, as well as higher energy density, and an improvement of the charge rate property is being studied.

However, in the secondary battery with high energy density using a nonaqueous electrolytic solution, the film thicknesses of respective electrode active material layers for positive and negative electrodes increase as the energy density increases. For this reason, the impregnation property of the electrolytic solution in the electrode is lowered, resultantly causing a problem that the charge rate property of the secondary battery lowers.

In order to solve these problems, for example, a method of forming a large number of independent holes in an active material layer is disclosed. As the method of forming holes, an insertion of a pin or a drill in an active material layer is carried out to form the holes (Patent Documents 1 and 2).

Further, Patent Document 3 discloses a method of thermally decomposing a part of the binder in the electrode mixture layer to form pores in the electrode mixture layer.

In contrast, Patent Document 4 suggests the addition of a moisture adsorbent into any portion of a nonaqueous electrolyte secondary battery, in order to suppress the reduction in the battery capacity of the nonaqueous electrolyte secondary battery. Examples of the moisture adsorbent include zeolite, activated alumina, activated carbon, silica gel, porous glass and the like. Further, Patent Document 5 discloses that in a secondary battery using a molten salt as an electrolyte, the charge and discharge capacity in the low temperature range can be increased, by using a porous body having pores as an electrode and placing a molten salt electrolyte in the pores.

PRIOR ART DOCUMENT

Patent Document

Patent Document 1: JP-A No. 2007-250510
Patent Document 2: JP-A No. 2015-95329
Patent Document 3: JP-A No. 2011-134691
Patent Document 4: JP-A No. 2001-126766
Patent Document 5: JP-A No. 2014-191904

SUMMARY OF THE INVENTION

Problem to be Solved by the Invention

However, according to the methods described in Patent Documents 1 to 3, a step of forming a hole is required and the production process becomes complicated, and the production cost also increases.

According to Patent Document 4, the moisture content in the battery can be remarkably reduced by the addition of the moisture adsorbent, whereby it is possible to suppress the decrease in the discharge capacity retention rate of the nonaqueous electrolyte secondary battery. However, no particular mention is made of the properties and the charge rate property of the moisture adsorbent. In Patent Document 5, there is a reference to the average pore diameter of the porous body, but there is no mention of the pore volume. In addition, there is no mention of the charge rate property.

The present invention has an example object of providing a lithium ion secondary battery having a high charge rate property while suppressing complication of the production process and an increase in cost.

Means for Solving the Problem

The electrode for lithium ion secondary batteries according to an example aspect of the present invention is characterized by containing porous glass particles and an electrode active material that is capable of occluding and releasing lithium ions, wherein the pore volume of the porous glass particles is from 0.1 ml/g to 2 ml/g.

Further, the lithium ion secondary battery according to another example aspect of the present invention is a lithium ion secondary battery comprising a positive electrode containing a positive electrode active material capable of occluding and releasing lithium ions, a negative electrode containing a negative electrode active material capable of occluding and releasing lithium ions, and a nonaqueous electrolytic solution, characterized in that at least one of the positive electrode and the negative electrode is the electrode having the above-described constitution.

Effect of the Invention

According to an example aspect of the present invention, by containing porous glass in the electrode as described above in the electrode for lithium ion secondary batteries, the electrolytic solution is held in the pores of the porous glass, thereby lithium ions can move smoothly in the electrode. Hence, it is possible to provide a lithium ion secondary battery with an excellent charge rate property.

BRIEF DESCRIPTION OF THE DRAWINGS

FIG. 1 is a schematic cross-sectional view of an electrode for lithium ion secondary batteries, and (a) shows an example of a conventional structure and (b) shows an example of the present invention to which porous glass particles are added.

FIG. 2 is a schematic cross-sectional view showing the constitution of one example of the lithium ion secondary battery of the present invention.

EXAMPLE EMBODIMENT

The present inventors have intensively studied to solve the above-described problems and resultantly found that the lithium ion secondary battery gets an excellent charge rate property by containing specific porous glass particles in a positive electrode or a negative electrode, leading to completion of the present invention.

That is, an electrode for a lithium ion secondary battery according to an example embodiment of the present invention includes porous glass particles having a pore volume of 0.1 to 2 ml/g and an electrode active material capable of occluding and releasing lithium ions.

FIG. 1 (a) is a schematic cross-sectional view of an electrode before adding porous glass particles, and FIG. 1 (b) is a schematic cross-sectional view of an electrode after addition of porous glass particles. An active material layer 1 is formed on a current collector 2. In FIG. 1 (a), since the electrode active material 1A is densely packed, the impregnating ability of electrolytic solution 3 is low. On the other hand, in FIG. 1 (b), by the addition of porous glass particles 4, the interval between electrode active materials is expanded, the impregnating ability of the electrolytic solution 3 is improved and the electrolytic solution 3 is held also in the void of the porous glass particles 4, thereby remarkably improving the stored amount of the electrolytic solution 3 in the active material layer 1. In particular, in the secondary battery having high energy density, it is expected that the charge rate property is improved greatly by suppressing the deterioration of the impregnation ability of the electrolytic solution due to the thickening of the electrode.

When the pore volume is within the above range, the impregnating ability and storability of the electrolytic solution in the electrode are improved, and an effect of improving the charge rate property is obtained.

The porous glass used in the present invention is silica glass including $SiO_2$ as a main component, and porous spherical glass particles are used. In particular, secondary particles obtained by aggregation of fine primary particles such as silica gel and silica sol are preferable in that an electrolytic solution can be held in voids between the primary particles.

The electrode for lithium ion secondary batteries (at least one of a positive electrode and a negative electrode) according to the present invention can include one or more kinds of the porous glass particles described above. The addition amount (content) of the above-described porous glass particles is preferably in the range of 0.2 to 10% by mass, more preferably 0.5 to 5% by mass, based on the total mass of the electrode active material.

Further, the average particle diameter of the porous glass particles is preferably in the range of 0.2 to 30 and more preferably in the range of 0.5 to 20 In addition, the porous glass particles have a particle diameter preferably not more than 2 times, more preferably not more than 1 time, particularly preferably not more than 0.7 times, with respect to the average particle diameter of an electrode active material to be used.

Furthermore, the pore volume of the porous glass particles is preferably in the range of 0.5 to 1.2 ml/g.

Hereinafter, a positive electrode, a negative electrode and a lithium ion secondary battery using the same according to example embodiments of the present invention will be described in detail.

<Positive Electrode>

A positive electrode for lithium ion secondary batteries according to an example embodiment of the present invention obtained by forming a positive electrode active material layer including a positive electrode active material, the above-described porous glass particles and a positive electrode binder on a positive electrode current collector can be used.

As the positive electrode active material, a lithium composite metal oxide containing a transition metal such as cobalt, manganese, nickel or the like and lithium can be used.

Specific examples of such lithium composite metal oxides include $LiCoO_2$, $LiMnO_2$, $LiMn_2O_4$, $LiNiO_2$, $LiCo_{1-x}Ni_xO_2$ $(0.01<x<1)$, $LiNi_{1/2}Mn_{3/2}O_4$, $LiNi_xCo_yMn_zO_2$ $(x+y+z=1)$, $LiNi_xCo_yAl_zO_2$ $(x+y+z=1)$ and $LiNi_{0.5}Mn_{1.5}O_4$. As the positive electrode active material, lithium-containing olivine type phosphates such as $LiFePO_4$ can be used.

Further, in these lithium composite metal oxides, those in which Li is made excessive over the stoichiometric composition and the like can also be mentioned. The lithium composite metal oxide in excess of Li includes $Li_{1+a}Ni_xMn_yO_2$ $(0<a\leq0.5, 0<x<1, 0<y<1)$, $Li_{1+a}Ni_xMn_yM_zO_2$ $(0<a\leq0.5, 0<x<1, 0<y<1, 0<z<1$, M is Co or Fe), $Li_\alpha Ni_\beta Co_\gamma Al_\delta O_2$ $(1\leq\alpha\leq1.2, \beta+\gamma=\delta=1, \beta\geq0.7, \gamma\leq0.2)$, and the like.

Furthermore, in order to improve cycle characteristics and safety, and to enable use at high charge potential, a part of the lithium composite metal oxide may be replaced with another element. For example, a part of cobalt, manganese and nickel may be substituted with at least one element such as Sn, Mg, Fe, Ti, Al, Zr, Cr, V, Ga, Zn, Cu, Bi, Mo, La or the like, a part of oxygen may be substituted with S or F, or the surface of a positive electrode may be coated with a compound containing these elements.

Specific compositions of the lithium composite metal oxide in the present embodiment include $LiMnO_2$, $LiCoO_2$, $LiNiO_2$, $LiMn_2O_4$, $LiCo_{0.8}Ni_{0.2}O_2$, $LiNi_{1/2}Mn_{3/2}O_4$, $LiNi_{1/3}Co_{1/3}Mn_{1/3}O_2$ (abbreviated as NCM111), $LiNi_{0.4}Co_{0.3}Mn_{0.3}O_2$ (abbreviated as NCM433), $LiNi_{0.5}Co_{0.2}Mn_{0.3}O_2$ (abbreviated as NCM523), $LiNi_{0.5}Co_{0.3}Mn_{0.2}O_2$ (abbreviated as NCM532), $LiFePO_4$, $LiNi_{0.8}Co_{0.15}Al_{0.05}O_2$, $LiNi_{0.8}Co_{0.1}Mn_{0.1}O_2$, $Li_{1.2}Mn_{0.4}Ni_{0.4}O_2$, $Li_{1.2}Mn_{0.6}Ni_{0.2}O_2$, $Li_{1.19}Mn_{0.52}Fe_{0.22}O_{1.98}$, $Li_{1.21}Mn_{0.46}Fe_{0.15}Ni_{0.15}O_2$, $LiMn_{15}Ni_{0.5}O_4$, $Li_{1.2}Mn_{0.4}Fe_{0.4}O_2$, $Li_{1.21}Mn_{0.4}Fe_{0.2}Ni_{0.2}O_2$, $Li_{1.26}Mn_{0.37}Ni_{0.22}Ti_{0.15}O_2$, $LiMn_{1.37}Ni_{0.5}Ti_{0.13}O_{4.0}$, $Li_{1.2}Mn_{0.56}Ni_{0.17}Co_{0.07}O_2$, $Li_{1.2}Mn_{0.54}Ni_{0.13}Co_{0.13}O_2$, $Li_{1.2}Mn_{0.56}Ni_{0.17}Co_{0.07}O_2$, $Li_{1.2}Mn_{0.54}Ni_{0.13}Co_{0.13}O_2$, $LiNi_{0.8}Co_{0.15}Al_{0.05}O_2$, $LiNi_{0.5}Mn_{1.48}Al_{0.02}O_4$, $LiNi_{0.5}Mn_{1.45}Al_{0.05}O_{3.9}F_{0.05}$, $LiNi_{0.4}Co_{0.2}Mn_{1.25}Ti_{0.15}O_4$, $Li_{1.23}Fe_{0.15}Ni_{0.15}Mn_{0.46}O_2$, $Li_{1.2}Fe_{0.20}Ni_{0.20}Mn_{0.40}O_2$, $Li_{1.29}Fe_{0.07}Ni_{0.14}Mn_{0.57}O_2$, $Li_{1.26}Fe_{0.22}Mn_{0.37}Ti_{0.15}O_2$, $Li_{1.29}Fe_{0.07}Ni_{0.07}Mn_{0.57}O_{2.8}$, $Li_{1.30}Fe_{0.04}Ni_{0.07}Mn_{0.61}O_2$, $Li_{1.2}Ni_{0.18}Mn_{0.54}Co_{0.08}O_2$, $Li_{1.23}Fe_{0.03}N_{0.03}Mn_{0.58}O_2$ and the like as an example.

Further, two or more kinds of lithium composite metal oxides as described above may be mixed and used, and for example, NCM532 or NCM523 and NCM433 may be mixed in a ratio of 9:1 to 1:9 (typically 2:1) and used, alternatively NCM532 or NCM523 and $LiMnO_2$, $LiCoO_2$ or $LiMn_2O_4$ may be mixed in a ratio of 9:1 to 1:9 and used The synthesis method of the lithium composite metal oxide represented by the above-described composition formula is not particularly limited, and a known oxide synthesis method can be applied.

The positive electrode active material can be used singly or in combination of two or more kinds thereof.

To the positive electrode active material layer including a positive electrode active material, a conductivity auxiliary agent can be added for the purpose of lowering the impedance. Examples of the conductivity auxiliary agent include graphites such as natural graphite and artificial graphite, and carbon blacks such as acetylene black, Ketjen black, furnace black, channel black, and thermal black. A plurality of types of conductivity auxiliary agents may be appropriately mixed and used. The amount of the conductivity auxiliary agent is preferably 1 to 10% by mass with respect to 100% by mass of a positive electrode active material.

The positive electrode binder is not particularly limited, and examples thereof include polyvinylidene fluoride, a vinylidene fluoride-hexafluoropropylene copolymer, a vinylidene fluoride-tetrafluoroethylene copolymer and the like. In addition, a styrene-butadiene copolymer rubber, polytetrafluoroethylene, polypropylene, polyethylene, polyimide, polyamideimide and the like may be used as the positive electrode binder. In particular, from the viewpoint of versatility and low cost, it is preferable to use polyvinylidene fluoride as the positive electrode binder. The amount of the positive electrode binder to be used is preferably 2 to 10 parts by mass with respect to 100 parts by mass of the positive electrode active material in consideration of trade off relationship between "sufficient bonding force" and "high energy".

As the positive electrode current collector, a general one can be arbitrarily used, but, for example, an aluminum foil or a lath plate made of stainless steel or the like can be used.

The positive electrode can be prepared, for example, by adding a solvent such as N-methylpyrrolidone to a mixture containing positive electrode active materials, porous glass particles, a binder and, if necessary, auxiliary agents such as a conductivity auxiliary agent, to prepare a slurry, applying the slurry on a current collector by a doctor blade method, a die coater method or the like, drying this, and if necessary, pressing this.

The load amount of the positive electrode active material layer is preferably 100 g/m² or more for achieving high energy density.

<Negative Electrode>

A negative electrode for lithium ion secondary batteries according to an Example Embodiment of the present invention, for example, obtained by forming a negative electrode active material layer containing negative electrode active materials, the above-described porous glass particles and a binder on a negative electrode current collector, can be used. By the binder, the negative electrode active material and the current collector are bound and the negative electrode active materials are mutually bound.

Examples of the negative electrode active material include lithium metal, metals or alloys capable of alloying with lithium, oxides capable of occluding and releasing lithium ions, carbonaceous materials capable of occluding and releasing lithium ions, and the like.

Examples of the metals or alloys capable of alloying with lithium include pure silicon, a lithium-silicon alloy, a lithium-tin alloy and the like.

Examples of the oxides capable of occluding and releasing lithium ions include silicon oxide, niobium pentoxide ($Nb_2O_5$), lithium-titanium composite oxide ($Li_{4/3}Ti_{5/3}O_4$), titanium dioxide ($TiO_2$) and the like.

Examples of the carbonaceous materials capable of occluding and releasing lithium ions include carbonaceous materials such as, for example, graphites (artificial graphite, natural graphite), carbon blacks (acetylene black, furnace black), coke, mesocarbon microbead, hard carbon and the like.

One kind of the negative electrode active material may be used alone, or two or more kinds thereof may be used together in any combination and ratio.

Among them, carbonaceous materials are preferable in that cycle characteristics and stability are excellent and further, a continuous charge property is also excellent.

As the carbonaceous material, graphite, amorphous carbon, diamond-like carbon, carbon nanotube, or a composite thereof can be suitably used. Graphite with high crystallinity has high electrical conductivity, excellent adhesion to a current collector made of a metal such as copper, and excellent voltage flatness. In contrast, since amorphous carbon having low crystallinity has relatively small volume expansion, it has a high effect of alleviating the volume expansion of the entire negative electrode, and deteriorations due to non-uniformity such as crystal grain boundaries and defects hardly occur. The content of the carbonaceous material in the negative electrode active material is preferably 2% by mass or more and 50% by mass or less, and more preferably 2% by mass or more and 30% by mass or less.

As the carbonaceous material, a heat-treated graphite material (heat-treated graphite) described in WO2015/146900 can also be used. Natural graphite and artificial graphite can be used as a raw graphite material used here. As the artificial graphite, ordinary products obtained by graphitizing coke or the like can be used. It may also be graphitized mesophase microspheres which are also called mesocarbon microbeads (MCMB). In addition, artificial graphite subjected to heat treatment in the range of 2000 to 3200° C. can also be used. From the viewpoints of charging efficiency, mixing property, moldability, etc., such a raw graphite material in particulate form can be used. The shape of the particles may be spherical, oval spherical, or scaly (flake). A general spheroidizing treatment may be performed. After subjecting this raw graphite material to a first heat treatment in an oxidizing atmosphere, a second heat treatment is performed at a temperature higher than that of the first heat treatment step, whereby a heat-treated graphite material is obtained.

The first heat treatment under the oxidizing atmosphere of the graphite material can usually be selected from a temperature range of 400 to 900° C. under atmospheric pressure. The heat treatment time is in the range of about 30 minutes to about 10 hours. Examples of the oxidizing atmosphere include oxygen, carbon dioxide, air and the like. Further, the oxygen concentration and the pressure can also be appropriately adjusted.

Following the first heat treatment, a second heat treatment is performed in an inert gas atmosphere. The second heat treatment is performed at a temperature higher than that of the first heat treatment and can be selected from a temperature range of 800° C. to 1400° C. under ordinary pressure. The heat treatment time is in the range of about 1 hour to about 10 hours. As the inert gas atmosphere, a rare gas atmosphere such as Ar or a nitrogen gas atmosphere can be used. After the second heat treatment, the material can be cleaned by washing with water and drying.

The first and second heat treatment steps can be carried out continuously in the same heating furnace. In that case, the oxidizing atmosphere in the first heat treatment step is replaced with an inert gas and then heated to the second heat treatment temperature. Alternatively, two heating furnaces may be arranged in series and the first heat treatment step and the second heat treatment step can be carried out separately. Further, between the first heat treatment step and the second heat treatment step, a certain amount of time may be left as long as it does not affect the surface state of the formed channel, and another step such as washing and drying may be interposed.

The average particle diameter of the raw graphite material is preferably 1 μm or more, more preferably 2 μm or more, further preferably 5 μm or more from the viewpoint of suppressing side reactions at the time of charging and discharging and suppressing reduction in charge and discharge efficiency, and is preferably 40 μm or less, more preferably 35 μm or less, further preferably 30 μm or less from the viewpoint of charge/discharge characteristics and viewpoint of electrode fabrication (smoothness of the electrode surface, etc.). Here, the average particle diameter denotes the particle diameter (median diameter: D50) at an integrated value of 50% in particle size distribution (volume based) by a laser diffraction scattering method.

From the viewpoint of capacity, a negative electrode active material containing silicon is preferable. As the negative electrode active material containing silicon, for example, silicon or a silicon compound or the like can be mentioned. As silicon, for example, pure silicon can be mentioned. As the silicon compound, for example, silicon oxides, silicates, a compound composed of a transition metal and silicon such as nickel silicide and cobalt silicide, and the like can be mentioned.

The silicon compound has a function of relaxing expansion and shrinkage against repeated charging and discharging of the negative electrode active material itself and the silicon compound is more preferable from the viewpoint of charge and discharge cycle characteristics. Depending on the kind of the silicon compound, it also has a function to ensure conduction between silicon. From this viewpoint, silicon oxides are preferable as the silicon compound.

The silicon oxide is not particularly limited, and for example, a material represented by $SiO_x$ ($0<x\le 2$) can be used. The silicon oxide may contain Li, and as the silicon oxide containing Li, for example, one represented by $SiLi_yO_z$ ($y>0, 2>z>0$) can be used. In addition, the silicon oxide may contain a trace amount of a metal element or a non-metal element. The silicon oxide can contain, for example, 0.1 to 5% by mass of one or more elements selected from, for example, nitrogen, boron and sulfur. By containing a trace amount of a metal element or a non-metal element, the electrical conductivity of the silicon oxide can be improved. Further, the silicon oxide may be crystalline or amorphous.

As the negative electrode active material, it is also possible to use one including a negative electrode active material containing silicon (preferably silicon or silicon oxide) and a carbonaceous material capable of occluding and releasing lithium ions. The carbonaceous material can be included in a state of being complexed with a negative electrode active material containing silicon (preferably silicon or silicon oxide). Like the silicon oxide, the carbonaceous material has a function of relaxing expansion and shrinkage against repeated charging and discharging of the negative electrode active material itself and a function to ensure conduction between silicon as the negative electrode active material. Therefore, better cycle characteristics can be obtained by coexistence of a negative electrode active material containing silicon (preferably silicon or silicon oxide) and a carbonaceous material.

As a method for manufacturing a negative electrode active material containing silicon and a silicon compound, the following method can be mentioned. When a silicon oxide is used as the silicon compound, for example, there is a method in which elemental silicon and a silicon oxide are mixed and sintered at high temperature under reduced pressure. When a compound composed of a transition metal and silicon is used as the silicon compound, for example, there are a method of mixing elemental silicon and a transition metal and melting them, and a method of coating a transition metal on the surface of elemental silicon by vapor deposition or the like.

In the manufacturing method described above, it is also possible to combine with compositing with carbon. For example, there are a method in which a mixed sintered body of elemental silicon and a silicon compound is introduced into a gaseous atmosphere of an organic compound under a high-temperature non-oxygen atmosphere to carbonize the organic compound to form a coating layer made of carbon, and a method in which a mixed sintered body of elemental silicon and a silicon compound and a precursor resin of carbon are mixed under a high-temperature non-oxygen atmosphere to carbonize the precursor resin to form a coating layer made of carbon. In this way, a coating layer composed of carbon can be formed around a core composed of elemental silicon and a silicon compound (for example, silicon oxide). As a result, suppression of volume expansion against charge and discharge and further improvement of cycle characteristics can be obtained.

In the case of using a negative electrode active material containing silicon as the negative electrode active material, a composite containing silicon, a silicon oxide and a carbonaceous material (hereinafter also referred to as Si/SiO/C composite) is preferable. Furthermore, it is preferable that all or part of the silicon oxide has an amorphous structure. The silicon oxide having an amorphous structure can suppress the volume expansion of silicon and carbonaceous materials which are other negative electrode active materials. Although this mechanism is not clear, it is presumed that the silicon oxide has an amorphous structure, so that there is some influence on the film formation on the interface between the carbonaceous material and the electrolytic solution. In addition, the amorphous structure is considered to have relatively few factors ascribable to non-uniformity such as crystal grain boundaries and defects. It can be confirmed by X-ray diffraction measurement (general XRD measurement) that all or part of the silicon oxide has an amorphous structure. Specifically, when the silicon oxide does not have an amorphous structure, a peak peculiar to the silicon oxide is observed, but in the case where all or part of the silicon oxide has an amorphous structure, a peak peculiar to the silicon oxide is observed in a broaden shape.

In the Si/SiO/C composite, it is preferable that all or part of the silicon is dispersed in the silicon oxide. By dispersing at least a part of silicon in the silicon oxide, the volume expansion of the negative electrode as a whole can be further suppressed, and decomposition of the electrolyte can also be suppressed. The fact that all or part of the silicon is dispersed in the silicon oxide can be confirmed by observing through a transmission electron microscope (general TEM observation) and energy dispersive X-ray spectroscopic measurement (general EDX measurement) in combination. Specifically, it is possible to observe the cross section of the sample and measure the oxygen concentration of the portion corresponding to silicon dispersed in the silicon oxide, thereby confirming that it is not an oxide.

In the Si/SiO/C composite, for example, all or part of the silicon oxide is in an amorphous structure, and all or part of silicon is dispersed in the silicon oxide. Such a Si/SiO/C composite can be prepared, for example, by a method disclosed in JP-A No. 2004-47404. That is, for example, the Si/SiO/C composite can be obtained by subjecting a silicon oxide to CVD treatment in an atmosphere containing an organic gas such as methane gas. In the Si/SiO/C composite obtained by such a method, the surface of particles made of a silicon oxide containing silicon is covered with carbon. Also, silicon forms nanoclusters in the silicon oxide.

In the Si/SiO/C composite, the ratio of silicon, a silicon oxide and a carbonaceous material is not particularly limited. The amount of silicon is preferably 5% by mass or more and 90% by mass or less, and more preferably 20% by mass or more and 50% by mass or less with respect to the Si/SiO/C composite. The amount of the silicon oxide is preferably 5% by mass or more and 90% by mass or less, and more preferably 40% by mass or more and 70% by mass or less with respect to the Si/SiO/C composite. The amount of the carbonaceous material is preferably 2% by mass or more and 50% by mass or less, more preferably 2% by mass or more and 30% by mass or less with respect to the Si/SiO/C composite.

In addition, the Si/SiO/C composite may be a mixture of elemental silicon, a silicon oxide and a carbonaceous material, and may be produced by mixing elemental silicon, a silicon oxide and a carbonaceous material by mechanical milling. For example, the Si/SiO/C composite can be obtained by mixing elemental silicon, a silicon oxide and a carbonaceous material in particulate form, respectively. For example, the average particle diameter of elemental silicon can be smaller than the average particle diameter of the carbonaceous material and the average particle diameter of the silicon oxide. In this way, the elemental silicon having a large volume change accompanying charging and discharging has a relatively small particle diameter, and the carbonaceous material and the silicon oxide having a small volume change have a relatively large particle diameter, so that dendrite formation and micronization are more effectively suppressed. In the process of charging and discharging, particles having a large particle diameter and particles having a small particle diameter alternately occlude and release lithium ions, thereby suppressing the occurrence of residual stress and residual strain. The average particle diameter of elemental silicon can be, for example, 20 µm or less, preferably 15 µm or less. It is preferable that the average particle diameter of the silicon oxide is ½ or less of the average particle diameter of the carbonaceous material. It is preferable that the average particle diameter of elemental silicon is ½ or less of the average particle diameter of the silicon oxide. It is also preferable that the average particle diameter of the silicon oxide is ½ or less of the average particle diameter of the carbonaceous material and the average particle diameter of the elemental silicon is ½ or less of the average particle diameter of the silicon oxide. If the average particle diameter is controlled within such a range, the effect of relaxing volume expansion can be more effectively obtained, and a secondary battery excellent in balance between energy density, cycle life and efficiency can be obtained. More specifically, it is preferable that the average particle diameter of the silicon oxide is ½ or less of the average particle diameter of the graphite, and the average particle diameter of elemental silicon is ½ or less of the average particle diameter of the silicon oxide. More specifically, the average particle diameter of elemental silicon can be set to, for example, 20 µm or less, and preferably 15 µm or less.

The negative electrode active material layer preferably includes the above-mentioned negative electrode active material capable of occluding and releasing lithium ions as a main component, and specifically, the content of the negative electrode active material is preferably 55% by mass or more, more preferably 65% by mass or more, based on the entire negative electrode active material layer including the negative electrode active material, the above-described porous glass particles, a negative electrode binder, and if necessary, various auxiliaries.

The negative electrode binder is not particularly limited, and for example, polyvinylidene fluoride, vinylidene fluoride-hexafluoropropylene copolymer, vinylidene fluoride-tetrafluoroethylene copolymer, styrene-butadiene copolymer rubber (SBR), polytetrafluoroethylene, polypropylene, polyethylene, polyimide, polyamideimide and the like can be used. Among them, polyimide, polyamideimide, SBR, polyacrylic acid (including lithium salt, sodium salt and potassium salt neutralized with alkali) and carboxymethyl cellulose (including lithium salt, sodium salt and potassium salt neutralized with alkali) are preferable because of a strong binding property. The amount of the negative electrode binder to be used is preferably 5 to 25 parts by mass based on 100 parts by mass of a negative electrode active material from the viewpoint of the binding force and energy density in trade-off relationship.

The negative electrode current collector is not particularly limited, and any one normally used for general lithium ion secondary batteries can be arbitrarily used. As a negative electrode current collector material, for example, a metal material such as copper, nickel, SUS or the like can be used. Among them, copper is particularly preferable from the viewpoint of ease of processing and cost. It is preferable that the negative electrode current collector is previously roughened. Examples of the shape of a negative electrode current collector include a foil shape, a flat plate shape, a mesh shape, and the like. It is possible to use also perforated type current collectors such as expand metals and punching metals.

As a method for manufacturing a negative electrode, it can be produced, for example, by kneading a mixture of the above-described negative electrode active material, a binder, and if necessary, various auxiliaries, and a solvent, to prepare a slurry, applying this slurry on a current collector, then, drying this, and if necessary, pressing this, like the above-described positive electrode production method.

The load amount of the negative electrode active material layer is preferably 60 g/m$^2$ or more, more preferably 65 g/m$^2$ or more for achieving high energy density.

<Lithium Ion Secondary Battery>

The lithium ion secondary battery according to an example embodiment of the present invention mainly includes a positive electrode, a negative electrode, a non-aqueous electrolytic solution, and a separator disposed between the positive electrode and the negative electrode. As the positive electrode and the negative electrode, the positive electrode and the negative electrode described above can be suitably used. Constituent members such as a non-aqueous electrolytic solution, a separator and the like other than the positive electrode and the negative electrode are not particularly limited, and those commonly used for general lithium ion secondary batteries can be applied. Hereinafter, constituent members other than the positive electrode and the negative electrode, which are suitable for the lithium ion secondary battery according to an example embodiment of the present invention, will be described.

<Nonaqueous Electrolytic Solution>

The nonaqueous electrolytic solution of the lithium ion secondary battery of the present invention mainly includes a nonaqueous organic solvent and an electrolyte, and further includes lithium difluorophosphate.

Examples of the solvent includes cyclic carbonates, linear carbonates, linear esters, lactones, ethers, sulfones, nitriles, phosphoric acid esters and the like, with cyclic carbonates and linear carbonates being preferred.

Specific examples of the cyclic carbonates include propylene carbonate, ethylene carbonate, butylene carbonate, vinylene carbonate, vinylethylene carbonate and the like.

Specific examples of the linear carbonates include dimethyl carbonate, diethyl carbonate, dipropyl carbonate, dibutyl carbonate, and the like. In addition, ethyl methyl carbonate, methyl propyl carbonate, methyl isopropyl carbonate, methyl butyl carbonate and the like can also be mentioned as specific examples of the linear carbonates.

Specific examples of the linear esters include methyl formate, methyl acetate, methyl propionate, ethyl propionate, methyl pivalate, ethyl pivalate and the like.

Specific examples of the lactones include γ-butyrolactone, δ-valerolactone, α-methyl-γ-butyrolactone and the like.

Specific examples of the ethers include tetrahydrofuran, 2-methyltetrahydrofuran, 1,3-dioxolane, 1,3-dioxane, 1,4-dioxane, 1,2-dimethoxyethane, 1,2-diethoxyethane, 2-dibutoxyethane and the like.

Specific examples of the sulfones include sulfolane, 3-methylsulfolane, 2,4-dimethylsulfolane, and the like.

Specific examples of the nitriles include acetonitrile, propionitrile, succinonitrile, glutaronitrile, adiponitrile and the like.

Specific examples of the phosphoric acid esters include trimethyl phosphate, triethyl phosphate, tributyl phosphate, trioctyl phosphate and the like.

The above-described nonaqueous solvent can be used singly or in combination of two or more kinds thereof. The combination of a plurality of types of nonaqueous solvents includes, for example, a combination of cyclic carbonates and linear carbonates. In particular, in order to realize excellent battery characteristics, a combination including at least cyclic carbonates and linear carbonates is more preferable.

Further, as a third solvent, fluorinated ether solvents, fluorinated carbonate solvents, fluorinated phosphoric acid esters or the like may be added to the combination of cyclic carbonates and linear carbonates.

Specific examples of the fluorinated ether solvent include $CF_3OCH_3$, $CF_3OC_2H_5$, $F(CF_2)_2OCH_3$, $F(CF_2)_2OC_2H_5$, $F(CF_2)_3OCH_3$, $F(CF_2)_3OC_2H_5$, $F(CF_2)_4OCH_3$, $F(CF_2)_4OC_2H_5$, $F(CF_2)_5OCH_3$, $F(CF_2)_5OC_2H_5$, $F(CF_2)_8OCH_3$, $F(CF_2)_8OC_2H_5$, $F(CF_2)_9OCH_3$, $CF_3CH_2OCH_3$, $CF_3CH_2OCHF_2$, $CF_3CF_2CH_2OCH_3$, $CF_3CF_2CH_2OCHF_2$, $CF_3CF_2CH_2O(CF_2)_2H$, $CF_3CF_2CH_2O(CF_2)_2F$, $HCF_2CH_2OCH_3$, $H(CF_2)_2OCH_2CH_3$, $H(CF_2)_2OCH_2CF_3$, $H(CF_2)_2CH_2OCHF_2$, $H(CF_2)_2CH_2O(CF_2)_2H$, $H(CF_2)_2CH_2O(CF_2)_3H$, $H(CF_2)_3CH_2O(CF_2)_2H$, $H(CF_2)_4CH_2O(CF_2)_2H$, $(CF_3)_2CHOCH_3$, $(CF_3)_2CHCF_2OCH_3$, $CF_3CHFCF_2OCH_3$, $CF_3CHFCF_2OCH_2CH_3$, $CF_3CHFCF_2CH_2OCHF_2$, $CF_3CHFCF_2CH_2OCH_2CF_2CF_3$, $H(CF_2)_2CH_2OCF_2CHFCF_3$, $CHF_2CH_2OCF_2CFHCF_3$, $F(CF_2)_2CH_2OCF_2CFHCF_3$, $CF_3(CF_2)_3OCHF_2$, and the like.

The fluorinated carbonate solvents include fluoroethylene carbonate, fluoromethyl methyl carbonate, 2-fluoroethyl methyl carbonate, ethyl-(2-fluoroethyl) carbonate, (2,2-difluoroethyl) ethyl carbonate, bis(2-fluoroethyl) carbonate, ethyl-(2,2,2-trifluoroethyl) carbonate, and the like.

The fluorinated phosphoric acid esters include tris(2,2,2-trifluoroethyl) phosphate, tris(trifluoromethyl) phosphate, tris(2,2,3,3-tetrafluoropropyl) phosphate and the like.

On the other hand, specific examples of the electrolyte include lithium salts such as lithium hexafluorophosphate ($LiPF_6$), lithiumbis(fluorosulfonyl)imide[$LiN(SO_2F)_2$], $LiBF_4$, $LiClO_4$, $LiN(SO_2CF_3)_2$, $LiN(SO_2C_2F_5)_2$, $CF_3SO_3Li$, $C_4F_9SO_3Li$, $LiAsF_6$, $LiAlCl_4$, $LiSbF_6$, $LiPF_4(CF_3)_2$, $LiPF_3(C_2F_5)_3$, $LiPF_3(CF_3)_3$, $(CF_2)_2(SO_2)_2NLi$, $(CF_2)_3(SO_2)_2Li$, lithiumbis(oxalate)borate, lithiumdifluoro(oxalato)borate and the like. These lithium salts can be used singly or in combination of two or more kinds thereof. In particular, it is preferable to contain $LiPF_6$ and $LiN(SO_2F)_2$. $LiN(SO_2F)_2$ can improve a charge rate property. On the other hand, when using $LiN(SO_2F)_2$ alone, there is a problem of corroding the aluminum of the current collector of a positive electrode. Therefore, it is preferable to use both $LiPF_6$ and $LiN(SO_2F)_2$, and by setting the concentration of $LiPF_6$ in the electrolytic solution to 0.3 M or more, corrosion of aluminum can be suppressed while maintaining a high charge rate property.

The concentration of the electrolyte salt dissolved in the nonaqueous electrolytic solution is preferably in the range of 0.3 to 3 mol/L, and more preferably in the range of 0.5 to 2 mol/L. When the concentration of the electrolyte salt is 0.3 mol/L or more, more sufficient ionic conductivity is obtained, and when the concentration of the electrolyte salt is 3 mol/L or less, an increase in the viscosity of the electrolytic solution is suppressed and more satisfactory ion mobility and impregnating property can be obtained.

Furthermore, the nonaqueous electrolytic solution of the present invention includes lithium difluorophosphate to further improve the charge rate property. Although details of the reason why the charge rate property is improved by including lithium difluorophosphate in the nonaqueous electrolytic solution are unknown, for example, it is conceivable that the charge rate is improved by formation of a low resistant film derived from lithium difluorophosphate on the surface of a positive electrode active material at the initial stage of charging. The lithium difluorophosphate contained in the nonaqueous electrolytic solution is preferably contained in an amount of 0.05% by mass to 10% by mass, and more preferably in an amount of 0.1% by mass to 5% by mass in the nonaqueous electrolytic solution.

In addition, the nonaqueous electrolytic solution can optionally contain known additive compounds for the nonaqueous electrolytic solution as other additive components other than lithium difluorophosphate. Examples thereof include vinylene carbonate, fluoroethylene carbonate, maleic anhydride, ethylene sulfite, boronic acid ester, 1,3-propanesultone, 1,5,2,4-dioxadithiane-2,2,4,4-tetraoxide and the like. One of these other additive compounds may be used alone or two or more of them may be used in combination.

<Separator>

Although a separator is not particularly limited, a single-layered or laminated porous film or nonwoven fabric made of a resin material such as polyolefin, e.g., polypropylene, polyethylene or the like can be used. Further, a film obtained by coating or laminating a different material on a resin layer such as polyolefin can also be used. As such a film, for example, a polyolefin base material coated with a fluorine compound or inorganic fine particles, a polyolefin base material laminated with an aramid layer, and the like can be mentioned.

The thickness of the separator is preferably 5 to 50 μm, more preferably 10 to 40 μm from the viewpoint of energy density of the battery and mechanical strength of the separator.

<Structure of Lithium Ion Secondary Battery>

The type of the lithium ion secondary battery is not particularly limited, and a coin type battery, a button type battery, a cylindrical type battery, a rectangular type battery, a laminate type battery and the like are listed.

For example, the laminate type battery can be manufactured by forming a laminate in which a positive electrode, a separator and a negative electrode are laminated alternately, connecting a metal terminal called a tab to each electrode, placing it in a container composed of a laminate film which is an outer pachaging, injecting an electrolytic solution and sealing.

The laminate film can be appropriately selected as long as it is stable to the electrolyte and has a sufficient water vapor barrier property. As such a laminate film, for example, a laminate film composed of a polyolefin (e.g., polypropylene, polyethylene) coated with an inorganic material such as aluminum, silica, alumina or the like can be used. In particular, from the viewpoint of suppressing volume expansion, an aluminum laminate film made of an aluminum-coated polyolefin is preferable.

As the representative layer structure of the laminate film, a constitution in which a metal thin film layer and a heat-fusible resin layer are laminated is exemplified. Further, as the other layer constitution of the laminate film, a constitution in which a resin film (protective layer) made of polyester such as polyethylene terephthalate or polyamide such as nylon is further laminated on the surface of the metal thin film layer on the side opposite to the heat-sealable resin layer side is mentioned. In the case of sealing a container made of a laminate film containing a laminate containing a positive electrode and a negative electrode, the heat-sealable resin layers of the laminate film are allowed to face, and a container is formed so that the heat-sealable resin layers can be fusion-bonded in the sealing portion. As the metal thin film layer of the laminate film, for example, a foil of Al, Ti, Ti alloy, Fe, stainless steel, Mg alloy or the like having a thickness of 10 to 100 μm is used. The resin used for the heat-sealable resin layer is not particularly limited as long as it is a resin that can be heat-sealed, and examples thereof include polypropylene, polyethylene, acid modification products thereof, polyphenylene sulfide, polyesters such as polyethylene terephthalate, polyamide, ethylene-vinyl acetate copolymer, ethylene-methacrylic acid copolymer and an ionomer resin obtained by intermolecular bonding of an ethylene-acrylic acid copolymer with a metal ion. The thickness of the heat-sealable resin layer is preferably 10 to 200 μm, more preferably 30 to 100 μm.

FIG. 2 shows an example of the structure of a lithium ion secondary battery according to an example embodiment of the present invention.

A positive electrode active material layer 11 including a positive electrode active material is formed on a positive electrode current collector 12, whereby a positive electrode 10 is constituted. As such a positive electrode, a single-sided electrode 10A having the positive electrode active material layer 11 formed on one side of the positive electrode current collector 12 and a double-sided electrode 10B having the positive electrode active material layers 11 formed on both sides of the positive electrode current collector 12 are used.

By forming a negative electrode active material layer 21 including a negative electrode active material on a negative electrode current collector 22, a negative electrode 20 is constituted. As such a negative electrode, a single-sided electrode 20A having the negative electrode active material layer 21 formed on one side of the negative electrode current collector 22 and a double-sided electrode 20B having the negative electrode active material layers 21 formed on both sides of the negative electrode current collector 22 are used.

As shown in FIG. 2, the positive electrode (cathode) and the negative electrode (anode) are opposed to each other via a separator 31 and laminated. Two positive electrode current collectors 12 are connected to each other at one end side, and a positive electrode tab 13 is connected to this connection part. Two negative electrode current collectors 22 are connected to each other on the other end side, and a negative electrode tab 23 is connected to this connection part. The laminate (power generation element) including a positive electrode and a negative electrode is accommodated in an outer packaging 41 and is in a state impregnated with an electrolyte. The positive electrode tab 13 and the negative electrode tab 23 are exposed outside the outer packaging 41. The outer packaging 41 is formed by using two rectangular laminate sheets, overlapping each other so as to enclose the power generation element, and heat-sealing the four side end portions.

EXAMPLES

The present invention will be described more specifically with reference to synthesis examples and examples mentioned below, but the present invention is not limited to these examples. The average particle diameter and the pore volume of porous glass particles are the catalog values of the products used.

<Production Example of Cathode Including Porous Glass Particle (GC1)>

$LiNi_{1/3}Co_{1/3}Mn_{1/3}O_2$ (NCM111) having an average particle diameter of 8 μm (D50 particle diameter) as a positive electrode active material, porous glass particles (average particle diameter 8.4 μm, pore volume 0.98 ml/g, manufactured by AGC SI-TECH CO., LTD., trade name: M.S.GEL, grade: EP-DM-10-1000AW), carbon black as a conductivity auxiliary agent and polyvinylidene fluoride as a positive electrode binder were weighed at a mass ratio of 92:2:3:3, and mixed with N-methylpyrrolidone, to prepare a positive electrode slurry. This positive electrode slurry was coated on one side of a positive electrode current collector 12 made of an aluminum foil having a thickness of 20 μm, dried and further pressed to form a positive electrode active material layer 11 having a thickness of 70 μm, to obtain a single-sided electrode 10A having the positive electrode active material layer formed on one side of the positive electrode current collector. Similarly, the positive electrode active material layer 11 was formed on the other surface of the positive electrode current collector 12, to obtain a double-sided electrode 10B having the positive electrode active material layer formed on both sides of the positive electrode current collector. The load amount of the positive electrode active material layer is 170 g/m².

<Production Example of Cathode Including Porous Glass Particle (GC2)>

$LiNi_{0.8}Co_{0.15}Al_{0.05}O_2$ (NCA1631) having an average particle diameter of 8 μm (D50 particle diameter) as a positive electrode active material, porous glass particles (average particle diameter 8.4 μm, pore volume 0.98 ml/g, manufactured by AGC SI-TECH CO., LTD., trade name: M.S.GEL, grade: EP-DM-10-1000AW), carbon black as a conductivity auxiliary agent and polyvinylidene fluoride as a positive electrode binder were weighed at a mass ratio of 92:2:3:3, and mixed with N-methylpyrrolidone, to prepare a positive electrode slurry. This positive electrode slurry was applied on one side of a positive electrode current collector 12 made of an aluminum foil having a thickness of 20 µm, dried and further pressed to form a positive electrode active material layer 11 having a thickness of 45 µm, to obtain a single-sided electrode 10A having the positive electrode active material layer formed on one side of the positive electrode current collector. Similarly, the positive electrode active material layer 11 was formed on the other side of the positive electrode current collector 12, to obtain a double-sided electrode 10B having the positive electrode active material layer formed on both sides of the positive electrode current collector. The load amount of the positive electrode active material layer is 125 g/m$^2$.

<Production Example of Cathode Including Porous Glass Particle (GC3)>

$LiNi_{0.8}Co_{0.15}Al_{0.05}O_2$ (NCA1631) having an average particle diameter of 8 µm (D50 particle diameter) as a positive electrode active material, porous glass particles (average particle diameter 8.4 µm, pore volume 0.98 ml/g, manufactured by AGC SI-TECH CO., LTD., trade name: M.S.GEL, grade: EP-DM-10-1000AW), carbon black as a conductivity auxiliary agent and polyvinylidene fluoride as a positive electrode binder were weighed at a mass ratio of 92:2:3:3, and mixed with N-methylpyrrolidone, to prepare a positive electrode slurry. This positive electrode slurry was coated on one side of a positive electrode current collector 12 made of an aluminum foil having a thickness of 20 µm, dried and further pressed to form a positive electrode active material layer 11 having a thickness of 40 µm, to obtain a single-sided electrode 10A having the positive electrode active material layer formed on one side of the positive electrode current collector. Similarly, the positive electrode active material layer 11 was formed on the other side of the positive electrode current collector 12, to obtain a double-sided electrode 10B having the positive electrode active material layer formed on both sides of the positive electrode current collector. The load amount of the positive electrode active material layer is 110 g/m$^2$.

<Production Example of Anode Including Porous Glass Particle (GA1)>

A graphite powder (92% by mass) having an average particle diameter of 10 µm which is a negative electrode active material and porous glass particles (average particle diameter 8.4 µm, pore volume 0.98 ml/g, manufactured by AGC SI-TECH CO., LTD., trade name: M. S. GEL, grade: EP-DM-10-1000 AW) and PVDF (6% by mass) were mixed and N-methylpyrrolidone was added to the mixture to prepare a slurry, and the slurry was coated on one side of a negative electrode current collector 22 made of a copper foil (thickness 10 µm) and dried to form a negative electrode active material layer 21 having a thickness of 70 µm, to obtain a single-sided negative electrode 20A having the negative electrode active material layer formed on one side of the negative electrode current collector. Similarly, the negative electrode active material layer 21 was formed on both sides of the negative electrode current collector 22, to obtain a double-sided electrode 20B having the negative electrode active material layer formed on both sides of the negative electrode current collector. The load amount of the negative electrode active material layer is 100 g/m$^2$.

<Production Example of Anode Including Porous Glass Particle (GA2)>

A natural graphite powder (spherical graphite) having an average particle diameter of 10 µm and a specific surface area of 5 m$^2$/g was subjected to a first heat treatment step in air at 480° C. for 1 hour, subsequently, subjected to a second heat treatment step in a nitrogen atmosphere at 1000° C. for 4 hours, to obtain a negative electrode carbon material. Next, the obtained negative electrode carbon material (92% by mass) and porous glass particles (average particle diameter 8.4 µm, pore volume 0.98 ml/g, manufactured by AGC SITEC CO., LTD., trade name: M. S. GEL, grade: EP-DM-10-1000 AW) (2% by mass) and polyvinylidene fluoride (PVDF) (6% by mass) were mixed and N-methylpyrrolidone was added to the mixture to prepare a slurry, and the slurry was coated on a negative electrode current collector 22 made of a copper foil (thickness 10 µm) and dried, to form a negative electrode active material layer 21 having a thickness of 70 µm, to obtain a single-sided negative electrode 20A having the negative electrode active material layer formed on one side of the negative electrode current collector. Similarly, the negative electrode active material layer 21 was formed on both sides of the negative electrode current collector 22, to obtain also a double-sided electrode 20B having the negative electrode active material layer formed on both sides of the negative electrode current collector. The load amount of the negative electrode active material layer is 100 g/m$^2$.

<Production Example of Anode Including Porous Glass Particle (GA3)>

A natural graphite powder (spherical graphite) having an average particle diameter of 10 µm and a specific surface area of 5 m$^2$/g was subjected to a first heat treatment step in air at 480° C. for 1 hour, subsequently, subjected to a second heat treatment step in a nitrogen atmosphere at 1000° C. for 4 hours, to obtain a negative electrode carbon material. Next, the obtained negative electrode carbon material (92% by mass) and porous glass particles (average particle diameter 8.4 µm, pore volume 0.98 ml/g, manufactured by AGC SI-TEC CO., LTD., trade name: M. S. GEL, grade: EP-DM-10-1000 AW) (2% by mass) and polyvinylidene fluoride (PVDF) (6% by mass) were mixed and N-methylpyrrolidone was added to the mixture to prepare a slurry, and the slurry was coated on a negative electrode current collector 22 made of a copper foil (thickness 10 µm) and dried, to form a negative electrode active material layer 21 having a thickness of 45 µm, to obtain a single-sided negative electrode 20A having the negative electrode active material layer formed on one side of the negative electrode current collector. Similarly, the negative electrode active material layer 21 was formed on both sides of the negative electrode current collector 22, to obtain also a double-sided electrode 20B having the negative electrode active material layer formed on both sides of the negative electrode current collector. The load amount of the negative electrode active material layer is 65 g/m$^2$.

<Production Example of Cathode Non-Included Porous Glass Particle (NGC1)>

NCM111 used in GC1 as a positive electrode active material, carbon black as a conductivity auxiliary agent and polyvinylidene fluoride as a positive electrode binder were weighed at a mass ratio of 94:3:3 and mixed with N-methylpyrrolidone, to prepare a positive electrode slurry. This a positive electrode slurry was applied on one side of a positive electrode current collector 12 made of an aluminum foil having a thickness of 20 µm, dried and further pressed to form a positive electrode active material layer 11 having a thickness of 70 µm, to obtain a single-sided electrode 10A having the positive electrode active material layer formed on one side of the positive electrode current collector. Similarly, the positive electrode active material layer 11 was formed on the other side of the positive electrode current collector 12, to obtain a double-sided electrode 10B having the positive electrode active material layer formed on both sides of the positive electrode current collector. The load amount of the positive electrode active material layer is 170 g/m².

<Production Example of Cathode Non-Included Porous Glass Particle (NGC2)>

NCA1631 used in GC2 as a positive electrode active material, carbon black as a conductivity auxiliary agent and polyvinylidene fluoride as a positive electrode binder were weighed at a mass ratio of 94:3:3 and mixed with N-methylpyrrolidone to prepare a positive electrode slurry. This positive electrode slurry was applied on one side of a positive electrode current collector 12 made of an aluminum foil having a thickness of 20 μm, dried and further pressed to form a positive electrode active material layer 11 having a thickness of 45 μm, to obtain a single-sided electrode 10A having the positive electrode active material layer formed on one side of the positive electrode current collector. Similarly, the positive electrode active material layer 11 was formed on the other side of the positive electrode current collector 12, to obtain a double-sided electrode 10B having the positive electrode active material layer formed on both sides of the positive electrode current collector. The load amount of the positive electrode active material layer is 125 g/m².

<Production Example of Cathode Non-Included Porous Glass Particle (NGC3)>

NCM1613 used in GC3 as a positive electrode active material, carbon black as a conductivity auxiliary agent and polyvinylidene fluoride as a positive electrode binder were weighed at a mass ratio of 94:3:3 and mixed with N-methylpyrrolidone to prepare a positive electrode slurry. This positive electrode slurry was coated on one side of a positive electrode current collector 12 made of an aluminum foil having a thickness of 20 μm, dried and further pressed to form a positive electrode active material layer 11 having a thickness of 40 μm, to obtain a single-sided electrode 10A having the positive electrode active material layer formed on one side of the positive electrode current collector. Similarly, the positive electrode active material layer 11 was formed on the other side of the positive electrode current collector 12, to obtain a double-sided electrode 10B having the positive electrode active material layer formed on both sides of the positive electrode current collector. The load amount of the positive electrode active material layer is 110 g/m².

<Production Example of Anode Non-Included Porous Glass Particle (NGA1)>

A graphite powder (94% by mass) as a negative electrode active material and PVDF (6% by mass) were mixed, and N-methylpyrrolidone was added to the mixture to prepare a slurry, and the resultant slurry was applied on one side of a negative electrode current collector 22 made of a copper foil (thickness 10 μm) and dried to form a negative electrode active material layer 21 having a thickness of 70 μm, to obtain a single-sided negative electrode 20A having the negative electrode active material layer was formed on one side of the negative electrode current collector. Similarly, the negative electrode active material layer 21 was formed on both sides of the negative electrode current collector 22, to obtain a double-sided electrode 20B having the negative electrode active material layer formed on both sides of the negative electrode current collector. The load amount of the negative electrode active material layer is 100 g/m².

<Production Example of Anode Non-Included Porous Glass Particle (NGA2)>

A negative electrode carbon material (94% by mass) used in GA2 was mixed with polyvinylidene fluoride (PVDF) (6% by mass) and N-methylpyrrolidone was added to the mixture to prepare a slurry, and the slurry was coated on a negative electrode current collector 22 made of a copper foil (thickness 10 μm) and dried to form a negative electrode active material layer 21 having a thickness of 70 μm, to fabricate a single-sided negative electrode 20A having the negative electrode active material layer formed on one side of the negative electrode current collector. Similarly, the negative electrode active material layer 21 was formed on both sides of the negative electrode current collector 22, to fabricate also a double-sided electrode 20B having the negative electrode active material layer formed on both sides of the negative electrode current collector. The load amount of the negative electrode active material layer is 100 g/m².

<Production Example of Anode Non-Included Porous Glass Particle (NGA3)>

A negative electrode carbon material (94% by mass) used in GA3 and polyvinylidene fluoride (PVDF) (6% by mass) were mixed and N-methylpyrrolidone was added to the mixture to prepare a slurry, and the slurry was coated on a negative electrode current collector 22 made of a copper foil (thickness 10 μm) and dried to form a negative electrode active material layer 21 having a thickness of 45 μm, to fabricate a single-sided negative electrode 20A having the negative electrode active material layer formed on one side of the negative electrode current collector. Similarly, the negative electrode active material layer 21 was formed on both sides of the negative electrode current collector 22, to fabricate also a double-sided electrode 20B having the negative electrode active material layer formed on both sides of the negative electrode current collector. The load amount of the negative electrode active material layer is 65 g/m².

<Preparation of Nonaqueous Electrolytic Solution>

Ethylene carbonate (EC) and dimethyl carbonate (DMC) and methyl ethyl carbonate (MEC) were mixed at a volume ratio (EC/DMC/MEC) of 20/40/40, and $LiPF_6$ was dissolved in the mixture at 0.6 mol/L and $LiN(SO_2F)_2$ (abbreviated as "LiFSI") was dissolved in the mixture at 0.6 mol/L, and lithium difluorophosphate was dissolved therein at 1% by mass, to prepare a nonaqueous electrolytic solution.

Example 1

<Fabrication of Lithium Ion Secondary Battery>

The positive electrode (GC1) and the negative electrode (NGA1) produced by the above processes were formed into a predetermined shape, then laminated interposing a porous film separator 31, and a positive electrode tab 13 and a negative electrode tab 23 were welded to respective electrodes, to obtain a power generating element. This power generating element was encapsulated in an outer packaging made of an aluminum laminate film 41, heat-sealed at the three side edge portions, and then, the above nonaqueous electrolytic solution was poured and impregnated at an appropriate degree of vacuum. Thereafter, the remaining one side portion was sealed by heat-sealing under reduced pressure to obtain a lithium ion secondary battery having the structure shown in FIG. 2 before the activation treatment.

<Activation Treatment Step>

The fabricated lithium ion secondary battery before the activation treatment was charged to 4.2 V at a current of 20 mA/g per the positive electrode active material and discharged to 1.5 V at the same current of 20 mA/g per the positive electrode active material, and this cycle was repeated twice. In this manner, a lithium ion secondary battery of the present example was obtained.

Example 2

A lithium ion secondary battery was fabricated in the same manner as in Example 1 except that the positive electrode (NGC1) was used as a positive electrode and the negative electrode (GA1) was used as a negative electrode.

Example 3

A lithium ion secondary battery was fabricated in the same manner as in Example 1 except that the positive electrode (NGC1) was used as a positive electrode and the negative electrode (GA2) was used as a negative electrode.

Example 4

A lithium ion secondary battery was fabricated in the same manner as in Example 1 except that the positive electrode (GC1) was used as a positive electrode and the negative electrode (GA2) was used as a negative electrode.

Example 5

A lithium ion secondary battery was fabricated in the same manner as in Example 1 except that the addition amount of NCM111 as the positive electrode active material was changed to 90% by mass and the addition amount of the porous glass was changed to 4% by mass.

Example 6

A lithium ion secondary battery was fabricated in the same manner as in Example 1 except that porous glass (average particle diameter 16.3 μm, pore volume 0.98 ml/g, manufactured by AGC SI-TECK CO., LTD., trade name: M. S. GEL, grade: EP-DM-20-1000AW) was added in an amount of 2% by mass instead of addition of the porous glass (average particle diameter 8.4 μm, pore volume 0.98 ml/g) in an amount of 2% by mass to a positive electrode.

Example 7

A lithium ion secondary battery was fabricated in the same manner as in Example 1 except that porous glass (average particle diameter 3.8 μm, pore volume 0.78 ml/g, manufactured by AGC SI-TECK CO., LTD., trade name: M. S. GEL, grade: EP-DM-5-1000AW2) was added in an amount of 2% by mass instead of addition of the porous glass (average particle diameter 8.4 μm, pore volume 0.98 ml/g) in an amount of 2% by mass to a positive electrode.

Example 8

A lithium ion secondary battery was fabricated in the same manner as in Example 1 except that porous glass (average particle diameter 11.7 μm, pore volume 0.8 ml/g, manufactured by AGC SI-TECK CO., LTD., trade name: SUNSPHERE, grade: H-121) was added in an amount of 2% by mass instead of addition of the porous glass (average particle diameter 8.4 μm, pore volume 0.98 ml/g) in an amount of 2% by mass to a positive electrode.

Example 9

A lithium ion secondary battery was fabricated in the same manner as in Example 1 except that porous glass (average particle diameter 0.7 μm, pore volume 1 ml/g, manufactured by Nissan Chemical Corporation, LIGHT-STAR (registered trademark), grade: LA-S20C) was added in an amount of 2% by mass instead of addition of the porous glass (average particle diameter 8.4 μm, pore volume 0.98 ml/g) in an amount of 2% by mass to a positive electrode.

Example 10

A lithium ion secondary battery was fabricated in the same manner as in Example 1 except that the positive electrode (GC2) was used as a positive electrode and the negative electrode (NGA1) was used as a negative electrode.

Example 11

A lithium ion secondary battery was fabricated in the same manner as in Example 1 except that the positive electrode (GC3) was used as a positive electrode and the negative electrode (NGA3) was used as a negative electrode.

Example 12

A lithium ion secondary battery was fabricated in the same manner as in Example 1 except that the positive electrode (GC3) was used as a positive electrode and the negative electrode (GA3) was used as a negative electrode.

Comparative Example 1

A lithium ion secondary battery was fabricated in the same manner as in Example 1 except that the positive electrode (NGC1) was used as a positive electrode and the negative electrode (NGA1) was used as a negative electrode.

Comparative Example 2

A lithium ion secondary battery was fabricated in the same manner as in Example 1 except that the positive electrode (NGC1) was used as a positive electrode and the negative electrode (NGA2) was used as a negative electrode.

Comparative Example 3

A lithium ion secondary battery was fabricated in the same manner as in Example 1 except that the positive electrode (NGC2) was used as a positive electrode and the negative electrode (NGA1) was used as a negative electrode.

Comparative Example 4

A lithium ion secondary battery was fabricated in the same manner as in Example 1 except that the positive electrode (NGC3) was used as a positive electrode and the negative electrode (NGA3) was used as a negative electrode.

<Evaluation Method of Lithium Ion Secondary Battery>
(Charge Rate Property)

The above lithium ion secondary battery was charged to 4.2 V at a constant current of 0.1 C in a thermostatic chamber at 20° C., discharged to 2.5 V at a constant current of 0.1 C, and the charge capacity at the first cycle at 0.1 C was determined. Next, it was charged to 4.2 V at a constant current of 6 C, discharged to 2.5 V at a constant current of 0.1 C, and the charge capacity at the first cycle at 6 C was determined. The charge rate property was determined from the following formula using the ratio of the charge capacity at the charge rate 6 C to the charge capacity at the charge rate 0.1 C obtained as described above.

Charge rate property (%)=(charge capacity at 6 C charge/charge capacity at 0.1 C charge)×100

<Evaluation Result of Lithium Ion Secondary Battery>

The positive electrode, the negative electrode, and the evaluation results (charge rate property) in the respective examples and comparative examples are summarized in Table 1.

TABLE 1

|  | Cathode | | Anode | | | Porous glass particle | | | Charge rate property[3] (%) |
|---|---|---|---|---|---|---|---|---|---|
|  | Active material | Load (g/m²) | Active material | Load (g/m²) | Added electrode | Average particle size (μm) | Pore volume (ml/g) | Added amount (mass %) |  |
| Example 1 | NCM111[1] | 170 | Graphite | 100 | Cathode | 8.4 | 0.98 | 2 | 72 |
| Example 2 | NCM111 | 170 | Graphite | 100 | Anode | 8.4 | 0.98 | 2 | 67 |
| Example 3 | NCM111 | 170 | Heat-treated graphite | 100 | Anode | 8.4 | 0.98 | 2 | 68 |
| Example 4 | NCM111 | 170 | Heat-treated graphite | 100 | Cathode & Anode | 8.4 | 0.98 | Each 2 | 72 |
| Example 5 | NCM111 | 170 | Graphite | 100 | Cathode | 8.4 | 0.98 | 4 | 71 |
| Example 6 | NCM111 | 170 | Graphite | 100 | Cathode | 16.7 | 0.98 | 2 | 73 |
| Example 7 | NCM111 | 170 | Graphite | 100 | Cathode | 3.8 | 0.78 | 2 | 69 |
| Example 8 | NCM111 | 170 | Graphite | 100 | Cathode | 11.7 | 0.8 | 2 | 71 |
| Example 9 | NCM111 | 170 | Graphite | 100 | Cathode | 0.7 | 1 | 2 | 69 |
| Comp. Ex. 1 | NCM111 | 170 | Graphite | 100 | — | — | — | — | 57 |
| Comp. Ex. 2 | NCM111 | 170 | Heat-treated graphite | 100 | — | — | — | — | 58 |
| Example 10 | NCA1631[2] | 125 | Graphite | 100 | Cathode | 8.4 | 0.98 | 2 | 80 |
| Example 11 | NCA1631 | 125 | Heat-treated graphite | 100 | Cathode | 8.4 | 0.98 | 2 | 82 |
| Comp. Ex. 3 | NCA1631 | 125 | Graphite | 100 | — | — | — | — | 70 |
| Example 12 | NCA1631 | 110 | Heat-treated graphite | 65 | Cathode & Anode | 8.4 | 0.98 | 2 | 85 |
| Comp. Ex. 4 | NCA1631 | 110 | Heat-treated graphite | 65 | — | — | — | — | 76 |

[1] $LiCo_{1/3}Ni_{1/3}Mn_{1/3}O_2$
[2] $LiNi_{0.8}Co_{0.15}Al_{0.05}O_2$
[3] Charge rate property (%) = (charge capacity at 6 C charge/charge capacity at 0.1 C charge) × 100

From the comparison of Examples 1 to 12 with Comparative Examples 1 to 4, it is understood that the charge rate property is excellent by adding porous glass particles to the electrode. In particular, as the load amount of an electrode active material layer is increased, the effect of adding porous glass particles becomes remarkable.

It was found from the above results that the electrode including porous glass particles is effective for improving the excellent charge rate property of a lithium ion secondary battery according to the example embodiment of the present invention.

INDUSTRIAL APPLICABILITY

Since a lithium ion secondary battery using a nonaqueous electrolytic solution according to an example embodiment of the present invention has an excellent charge rate property, the lithium ion secondary battery can be used, for example, in all industrial fields requiring power supply, and industrial fields related to transportation, storage and supply of electrical energy. Specifically, the lithium ion secondary battery can be used as a power source for mobile devices such as mobile phones, laptop computers, tablet type terminals, portable game machines and the like. The lithium ion secondary battery can also be used as a power source for moving/transportation media such as an electric vehicle, a hybrid car, an electric motorcycle, an electrically assisted bicycle, a transport cart, a robot, a drone (compact unmanned aerial vehicle) and the like. Furthermore, the lithium ion secondary battery can be used for household power storage systems, backup power sources such as UPS, power storage equipment for storing electric power generated by solar power generation, wind power generation, or the like.

The present invention has been described above in reference to example embodiments and working examples, but the present invention is not limited to the above example embodiments and working examples. Various modifications can be made to the configurations and details of the present invention within the scope of the present invention as can be understood by those skilled in the art.

This application claims priority based on Japanese Patent Application No. 2016-211715 filed on Oct. 28, 2016, the disclosure of which is incorporated herein in its entirety.

EXPLANATION OF NUMERALS

1: electrode active material layer
1A: electrode active material
2: electrode current collector
3: electrolytic solution
4: porous glass particle
10: positive electrode
10A: single-sided electrode
10B: double-sided electrode
11: positive electrode active material layer
12: positive electrode current collector
13: positive electrode tab 20: negative electrode
20A: single-sided electrode
20B: double-sided electrode
21: negative electrode active material layer
22: negative electrode current collector
23: negative electrode tab
31: separator
41: outer packaging

The invention claimed is:

1. An electrode for a lithium ion secondary battery, comprising:
a porous silica glass particle and
an electrode active material that is capable of occluding and releasing lithium ions,
wherein the pore volume of the porous silica glass particle is from 0.1 ml/g to 2 ml/g.

2. The electrode for a lithium ion secondary battery according to claim 1, wherein the electrode is a positive electrode comprising at least one positive electrode active material selected from the group consisting of $LiMnO_2$, $LiMn_2O_4$, $LiCoO_2$, $LiNiO_2$, $LiNi_xCo_yMn_zO_2$ (x+y+z=1, 0<x<1, 0<y<1, 0<z<1) and $LiNi_xCo_yAl_zO_2$ (x+y+z=1) as the electrode active material.

3. The electrode for a lithium ion secondary battery according to claim 2, wherein the load amount of an active material layer in the positive electrode is 100 g/m² or more.

4. The electrode for a lithium ion secondary battery according to claim 1, wherein the electrode is a negative electrode comprising at least one negative electrode active material selected from the group consisting of graphite, heat-treated graphite, carbon black and hard carbon.

5. The electrode for a lithium ion secondary battery according to claim 4, wherein the load amount of an active material layer in the negative electrode is 60 g/m² or more.

6. The electrode for a lithium ion secondary battery according to claim 1, wherein the average particle diameter of the porous silica glass particle is 0.2 to 30 μm.

7. The electrode for a lithium ion secondary battery according claim 1, wherein the addition amount of the porous silica glass particle is 0.2 to 10% by mass based on the total mass of the electrode active material.

8. A lithium ion secondary battery comprising:
a positive electrode containing a positive electrode active material capable of occluding and releasing lithium ions;
a negative electrode containing a negative electrode active material capable of occluding and releasing lithium ions; and
a nonaqueous electrolytic solution,
wherein at least one of the positive electrode and negative electrode is an electrode comprising a porous glass particle and an electrode active material that is capable of occluding and releasing lithium ions, wherein the pore volume of the porous glass particle is from 0.1 ml/g to 2 ml/g.

9. The lithium ion secondary battery according to claim 8, wherein an electrolyte salt of the nonaqueous electrolytic solution comprises lithium hexafluorophosphate and lithiumbis(fluorosulfonyl)imide.

10. The lithium ion secondary battery according to claim 8, wherein the nonaqueous electrolytic solution further contains lithium difluorophosphate.

11. The lithium ion secondary battery according to claim 8, wherein the electrode comprising the porous glass particle and the electrode active material is the positive electrode comprising at least one positive electrode active material selected from the group consisting of $LiMnO_2$, $LiMn_2O_4$, $LiCoO_2$, $LiNiO_2$, $LiNi_xCo_yMn_zO_2$ (x+y+z=1, 0<x<1, 0<y<1, 0<z<1) and $LiNi_xCo_yAl_zO_2$ (x+y+z=1) as the electrode active material.

12. The lithium ion secondary battery according to claim 11, wherein the load amount of an active material layer in the positive electrode is 100 g/m² or more.

13. The lithium ion secondary battery according to claim 8, wherein the electrode comprising the porous glass particle and the electrode active material is the negative electrode comprising at least one negative electrode active material selected from the group consisting of graphite, heat-treated graphite, carbon black and hard carbon.

14. The lithium ion secondary battery according to claim 13, wherein the load amount of an active material layer in the negative electrode is 60 g/m² or more.

15. The lithium ion secondary battery according to claim 8, wherein the average particle diameter of the porous glass particle is 0.2 to 30 μm.

16. The lithium ion secondary battery according to claim 8, wherein the addition amount of the porous glass particle is 0.2 to 10% by mass based on the total mass of the electrode active material.

17. The lithium ion secondary battery according to claim 8, wherein the porous glass particle is a porous silica glass particle.

18. An electrode for a lithium ion secondary battery, comprising:
a porous glass particle and
an electrode active material that is capable of occluding and releasing lithium ions,
wherein the pore volume of the porous glass particle is from 0.1 ml/g to 2 ml/g, and,
wherein the addition amount of the porous glass particle is 0.2 to 10% by mass based on the total mass of the electrode active material.

19. The electrode for a lithium ion secondary battery according to claim 18, wherein the electrode is a positive electrode comprising at least one positive electrode active material selected from the group consisting of $LiMnO_2$, $LiMn_2O_4$, $LiCoO_2$, $LiNiO_2$, $LiNi_xCo_yMn_zO_2$ (x+y+z=1, 0<x<1, 0<y<1, 0<z<1) and $LiNi_xCo_yAl_zO_2$ (x+y+z=1) as the electrode active material.

20. The electrode for a lithium ion secondary battery according to claim 19, wherein the load amount of an active material layer in the positive electrode is 100 g/m² or more.

* * * * *